United States Patent
Wu

(10) Patent No.: US 10,165,553 B2
(45) Date of Patent: Dec. 25, 2018

(54) DEVICE AND METHOD OF HANDLING COMMUNICATION OPERATIONS IN A LICENSED FREQUENCY BAND AND AN UNLICENSED FREQUENCY BAND

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/806,672

(22) Filed: Jul. 23, 2015

(65) Prior Publication Data

US 2016/0037503 A1 Feb. 4, 2016

Related U.S. Application Data

(60) Provisional application No. 62/030,090, filed on Jul. 29, 2014.

(51) Int. Cl.
| | |
|---|---|
| *H04L 5/00* | (2006.01) |
| *H04W 16/14* | (2009.01) |
| *H04W 72/04* | (2009.01) |

(52) U.S. Cl.
CPC ......... *H04W 72/0406* (2013.01); *H04L 5/001* (2013.01); *H04W 16/14* (2013.01);
(Continued)

(58) Field of Classification Search
CPC ..... H04W 16/14; H04W 24/02; H04W 72/04; H04W 72/042; H04W 72/0446;
(Continued)

(56) References Cited

U.S. PATENT DOCUMENTS 5,850,596 A * 12/1998 Reynolds ................. H04B 1/10
 370/480
8,619,545 B2 * 12/2013 Linkola ................. H04W 88/08
 370/214
(Continued)

FOREIGN PATENT DOCUMENTS

| CN | 102215592 A | 10/2011 |
| CN | 102404783 A | 4/2012 |
(Continued)

OTHER PUBLICATIONS

Office Action dated Jun. 21, 2016 for the Japanese Application No. 2015-148324, filing date Jul. 28, 2015, pp. 1-3.
(Continued)

*Primary Examiner* — Eric Nowlin
(74) *Attorney, Agent, or Firm* — Winston Hsu

(57) ABSTRACT

A communication device for handling communication operations in a licensed frequency band and an unlicensed frequency band comprises a storage unit for storing instructions and a processing means coupled to the storage unit. The instructions comprise performing a first communication operation on a first carrier in a first unlicensed frequency band; receiving a message from a network for indicating the communication device to perform a second communication operation with the network on a second carrier in the first unlicensed frequency band; and switching the first communication operation from the first carrier in the first unlicensed frequency band to a third carrier in a second unlicensed frequency band. The processing means is configured to execute the instructions stored in the storage unit.

12 Claims, 8 Drawing Sheets

(52) U.S. Cl.
CPC ......... *H04W 72/042* (2013.01); *H04L 5/0062* (2013.01); *H04W 72/0453* (2013.01)

(58) Field of Classification Search
CPC ......... H04W 72/0453; H04W 72/1215; H04W 72/14; H04W 74/0816; H04W 84/12; H04W 88/10; H04W 88/06; H04W 74/0808; H04L 5/0023; H04L 27/0006

See application file for complete search history.

(56) References Cited

U.S. PATENT DOCUMENTS

| | | | | |
|---|---|---|---|---|
| 8,885,635 | B2* | 11/2014 | Linkola | H04W 12/08 370/352 |
| 9,119,154 | B2* | 8/2015 | Etemad | H04W 4/70 |
| 9,439,197 | B1* | 9/2016 | Ngo | H04W 72/0453 |
| 9,686,688 | B2* | 6/2017 | Hedayat | H04W 16/14 |
| 9,730,170 | B2* | 8/2017 | Kwak | H04W 56/001 |
| 2007/0026868 | A1* | 2/2007 | Schulz | H04M 3/2227 455/454 |
| 2008/0205365 | A1* | 8/2008 | Russell | H04W 88/06 370/341 |
| 2010/0014507 | A1* | 1/2010 | Linkola | H04W 12/08 370/352 |
| 2011/0212696 | A1* | 9/2011 | Hahn | H04B 1/525 455/83 |
| 2011/0312288 | A1 | 12/2011 | Fu | |
| 2012/0020231 | A1 | 1/2012 | Chen | |
| 2012/0250631 | A1 | 10/2012 | Hakola | |
| 2012/0307744 | A1 | 12/2012 | Charbit | |
| 2012/0307748 | A1* | 12/2012 | Cheng | H04L 5/0005 370/329 |
| 2014/0043979 | A1* | 2/2014 | Etemad | H04W 4/70 370/237 |
| 2014/0269468 | A1* | 9/2014 | Jia | H04W 24/02 370/311 |
| 2014/0378157 | A1* | 12/2014 | Wei | H04W 16/14 455/454 |
| 2015/0009869 | A1* | 1/2015 | Clegg | H04L 5/0062 370/278 |
| 2015/0049741 | A1* | 2/2015 | Chen | H04W 48/12 370/336 |
| 2015/0063151 | A1* | 3/2015 | Sadek | H04W 24/08 370/252 |
| 2015/0065152 | A1* | 3/2015 | Sadek | H04W 72/0453 455/450 |
| 2015/0126207 | A1* | 5/2015 | Li | H04W 72/082 455/452.1 |
| 2015/0131536 | A1* | 5/2015 | Kaur | H04L 5/001 370/329 |
| 2015/0133184 | A1* | 5/2015 | Sadek | H04W 16/14 455/552.1 |
| 2015/0146645 | A1* | 5/2015 | Sergeyev | H04L 5/0032 370/329 |
| 2015/0156636 | A1* | 6/2015 | Tabet | H04W 16/14 370/329 |
| 2015/0222414 | A1* | 8/2015 | Tabet | H04L 7/0016 370/350 |
| 2015/0223075 | A1* | 8/2015 | Bashar | H04W 16/14 370/329 |
| 2015/0223243 | A1* | 8/2015 | Tabet | H04W 28/085 370/330 |
| 2015/0245376 | A1* | 8/2015 | Bashar | H04L 1/18 370/277 |
| 2015/0256303 | A1* | 9/2015 | Belghoul | H04L 5/001 370/329 |
| 2015/0264702 | A1* | 9/2015 | Yang | H04W 72/0453 455/452.1 |
| 2015/0305037 | A1* | 10/2015 | Zhang | H04W 72/0406 370/329 |
| 2015/0312888 | A1* | 10/2015 | Li | H04W 76/021 370/329 |
| 2015/0319701 | A1* | 11/2015 | Ng | H04L 5/005 370/311 |
| 2015/0319784 | A1* | 11/2015 | Bhushan | H04W 74/0816 370/329 |
| 2015/0351095 | A1* | 12/2015 | Wilhelmsson | H04W 72/0453 370/329 |
| 2015/0358944 | A1* | 12/2015 | Kwak | H04W 56/001 370/329 |
| 2015/0382398 | A1* | 12/2015 | Guo | H04W 52/0206 370/328 |
| 2016/0007350 | A1* | 1/2016 | Xiong | H04W 24/10 370/252 |
| 2016/0007373 | A1* | 1/2016 | Davydov | H04L 5/001 370/329 |
| 2016/0021664 | A1* | 1/2016 | Chou | H04W 52/0229 370/329 |
| 2016/0044516 | A1* | 2/2016 | Hedayat | H04W 16/14 370/329 |
| 2016/0057186 | A1* | 2/2016 | Jose | H04L 45/02 370/312 |
| 2016/0073405 | A1* | 3/2016 | Khawer | H04L 5/0007 370/329 |
| 2016/0088631 | A1* | 3/2016 | Hedayat | H04W 16/14 370/329 |
| 2016/0088642 | A1* | 3/2016 | Yang | H04W 24/08 455/451 |
| 2016/0100318 | A1* | 4/2016 | Wei | H04W 16/14 370/329 |
| 2016/0128050 | A1* | 5/2016 | Sheu | H04W 4/02 370/329 |
| 2016/0165604 | A1* | 6/2016 | Khawer | H04W 16/14 455/452.1 |
| 2016/0183131 | A1* | 6/2016 | Khawer | H04W 36/0011 370/331 |
| 2016/0183220 | A1* | 6/2016 | Rashid | H04W 72/042 370/329 |
| 2016/0219448 | A1* | 7/2016 | Davydov | H04W 74/0816 |
| 2016/0219487 | A1* | 7/2016 | Khawer | H04W 48/14 |
| 2016/0233989 | A1* | 8/2016 | Belghoul | H04L 1/1887 |
| 2016/0255643 | A1* | 9/2016 | Malik | H04W 72/1215 370/329 |
| 2016/0337177 | A1* | 11/2016 | Lindoff | H04W 16/14 |
| 2016/0345360 | A1* | 11/2016 | Papaleo | H04W 74/08 |
| 2017/0290048 | A1* | 10/2017 | Amuru | H04W 72/0446 |

FOREIGN PATENT DOCUMENTS

| | | |
|---|---|---|
| JP | 2013534798 A | 9/2013 |
| JP | 2013535139 A | 9/2013 |
| WO | WO 2016072791 A1 * | 5/2016 ............. H04L 5/001 |

OTHER PUBLICATIONS

Pantech, Operation scenarios of ICO, 3GPP TSG-RAN WG2 Metting #75bis, R2-115188, Oct. 10-15, 2011, pp. 1-4, zhuhai, China.

Notice of allowance dated Jul. 26, 2016 for the Japanese Application No. 2015-148324, filing date Jul. 28, 2015, pp. 1-3.

3GPP TS 36.331 V12.2.0 (Jun. 2014) Technical Specification 3rd Generation Partnership Project; Technical Specification Group Radio Access Network; Evolved Universal Terrestrial Radio Access (E-UTRA); Radio Resource Control (RRC); Protocol specification (Release 12).

3GPP TS 36.300 V12.2.0 (Jun. 2014) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12).

European Search report dated Oct. 21, 2015 for EP application No. 15178472.5.

ZTE, "Discussion on LTE in Unlicensed Spectrum", 3GPP workshop on LTE in unlicensed spectrum, RWS-140021, Jun. 13, 2014, Sophia Antipolis, France, XP050774767.

"Qualcomm Research LTE in Unlicensed Spectrum: Harmonious Coexistence with Wi-Fi", Jun. 2014, XP055183824.

(56) References Cited

OTHER PUBLICATIONS

Office action dated Mar. 27, 2018 for the China application No. 201510454642.3, filing date Jul. 29, 2015, p. 1-8.

\* cited by examiner

DEVICE AND METHOD OF HANDLING COMMUNICATION OPERATIONS IN A LICENSED FREQUENCY BAND AND AN UNLICENSED FREQUENCY BAND

CROSS REFERENCE TO RELATED APPLICATIONS

This application claims the benefit of U.S. Provisional Application No. 62/030,090, filed on Jul. 29, 2014 and incorporated herein by reference.

BACKGROUND OF THE INVENTION

1. Field of the Invention

The present invention relates to a communication device and a method used in a wireless communication system and related communication device, and more particularly, to a communication device and method of handling communication operations in a licensed frequency band and an unlicensed frequency band in a wireless communication system.

2. Description of the Prior Art

A long-term evolution (LTE) system developed by the 3rd Generation Partnership Project (3GPP) is a successor of the universal mobile telecommunication system (UMTS) for further enhancing performance of the UMTS to satisfy increasing needs of data transmission. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

In general, WiFi transmission and WiFi reception may be performed on a carrier in an unlicensed frequency band. On the other hand, in the LTE system, the UE may perform a UL transmission and/or a downlink (DL) reception with the network in a licensed frequency band.

In order to ease load of network traffic in the LTE system, network operators offload part of the network traffic to the unlicensed frequency band by deploying a large amount of WiFi Access Points (APs). However, deploying numerous WiFi APs may not always achieve expected network performance improvement. It is preferable that a communication interfacing unit of the communication device in the LTE system can operate the UL transmission and/or the DL reception in the unlicensed frequency band.

However, when the LTE system is allowed to operate in an unlicensed frequency, the transmissions/receptions from the LTE system and other technologies (e.g., WiFi and Bluetooth) may interfere with each other as they are all in the same unlicensed frequency. Hence, how to handle the communication operations in the licensed frequency band and the unlicensed frequency band for a communication device in the LTE system is an important topic to be discussed.

SUMMARY OF THE INVENTION

The present invention therefore provides a communication device and a method for handling communication operations in a licensed frequency band and an unlicensed frequency band to solve the abovementioned problem.

A communication device for handling communication operations in a licensed frequency band and an unlicensed frequency band comprises a storage unit for storing instructions and a processing means coupled to the storage unit. The instructions comprise performing a first communication operation on a first carrier in a first unlicensed frequency band; receiving a message from a network for indicating the communication device to perform a second communication operation with the network on a second carrier in the first unlicensed frequency band; and switching the first communication operation from the first carrier in the first unlicensed frequency band to a third carrier in a second unlicensed frequency band. The processing means is configured to execute the instructions stored in the storage unit.

A communication device for handling communication operations in a licensed frequency band and an unlicensed frequency band comprises a storage unit for storing instructions and a processing means coupled to the storage unit. The instructions comprise performing a first communication operation with a network on a first carrier in a first unlicensed frequency band; and activating a second communication operation on a second carrier which is not adjacent to the first carrier while performing the first communication operation with the network on the first carrier in the first unlicensed frequency band. The processing means is configured to execute the instructions stored in the storage unit.

A network for handling communication operations in a licensed frequency band and an unlicensed frequency band comprises a storage unit for storing instructions and a processing means coupled to the storage unit. The instructions comprise configuring a communication device to perform a first communication operation on a first carrier in a first unlicensed frequency band; receiving a first message transmitted by the communication device, wherein the first message indicates that a second communication operation is activated in the first unlicensed frequency band; and transmitting a second message to indicate the communication device to release the first carrier in the first unlicensed frequency band according to the first message. The processing means is configured to execute the instructions stored in the storage unit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
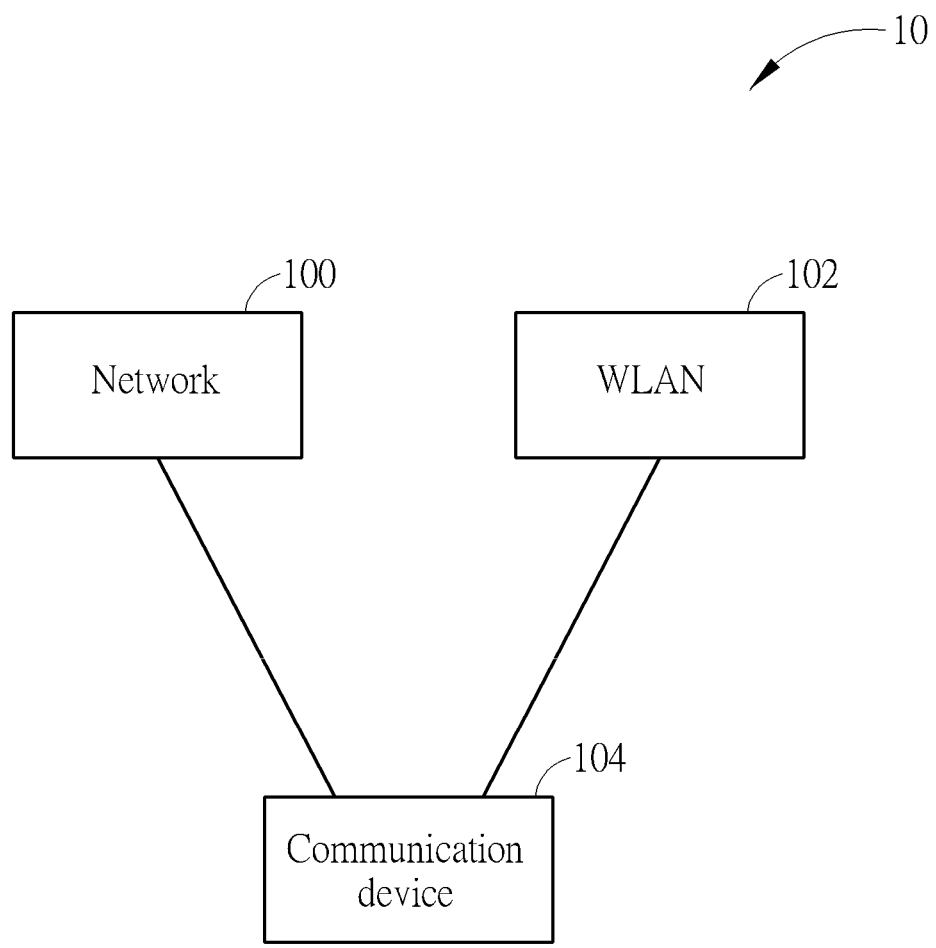
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network 100, a Wireless Local Area Network (WLAN) 102 and a communication device 104. The wireless communication system 10 may support a time-division duplexing (TDD) mode, a frequency-division duplexing (FDD) mode or a TDD-FDD joint operation mode. That is, the network and the communication device may communicate with each other via FDD carrier (s) and/or TDD carrier (s). In addition, the wireless communication system 10 may support a carrier aggregation (CA). That is, the network and the communication device may communicate with each other via multiple cells (e.g., multiple carriers) including a primary cell (e.g., primary component carrier (PCC)) and one or more secondary cells (e.g., secondary component carriers (SCCs)).

In FIG. 1, the network 100, the WLAN 102 and the communication device 104 are simply utilized for illustrating the structure of the wireless communication system 10. Practically, the network 100 (e.g., cellular network) can be a universal terrestrial radio access network (UTRAN) comprising a plurality of Node-Bs (NBs) in a universal mobile telecommunications system (UMTS). In another example, the network 100 can be an evolved UTRAN (E-UTRAN) comprising a plurality of evolved NBs (eNBs) in a long term evolution (LTE) system. The WiFi standard operated by the WLAN 102 may include 802.11ac, 802.11n, 802.11g, 802.11b and 802.11a operated in 2.4 GHz or 5 GHz spectrum (e.g., band).

The communication device 104 can be a user equipment (UE), a low cost device (e.g., machine type communication (MTC) device), a device-to-device (D2D) device, a mobile phone, a laptop, a tablet computer, an electronic book, a portable computer system, a car, a ship, an airplane or combination thereof.

Figure 2:
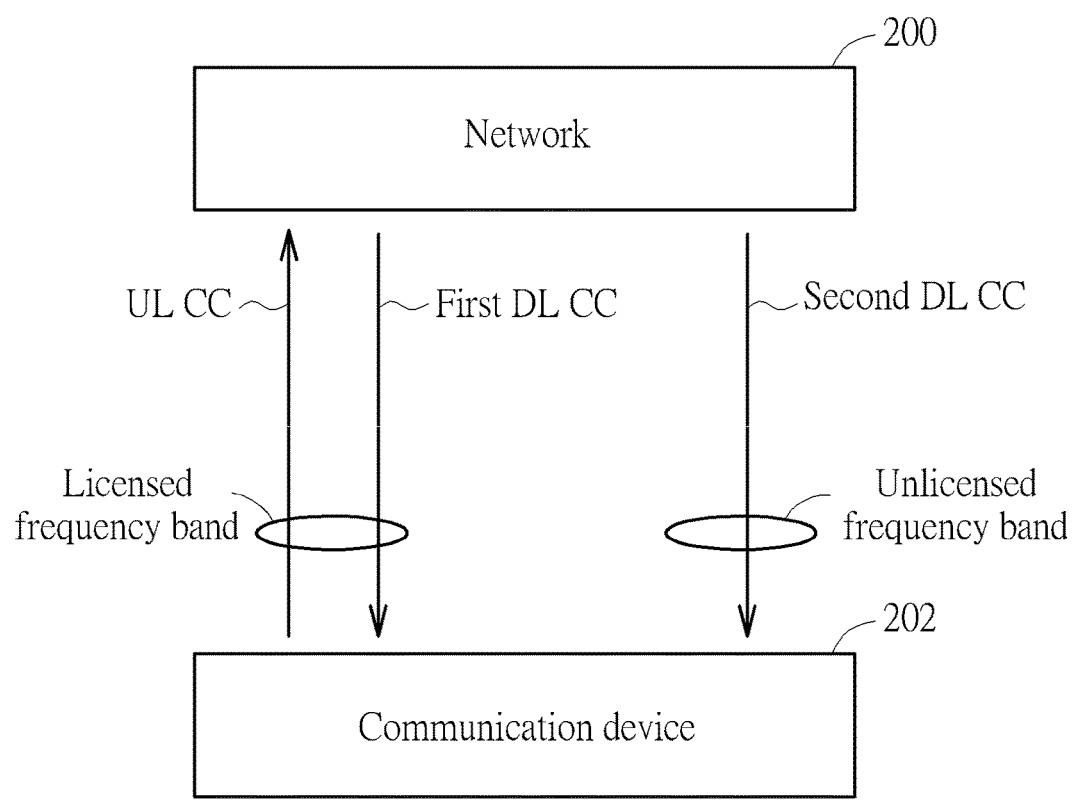
FIG. 2 is a schematic diagram of communication operations between a communication device and the network according to an example of the present invention.

Please refer to FIG. 2, which is a schematic diagram of communication operations between a communication device 202 and the network 200 according to an example of the present invention. The communication device 202 may be a communication device 104 shown in FIG. 1, but is not limited herein. The network 200 may configure the communication device 202 a first DL component carrier (CC) in a licensed frequency band and a second DL CC in an unlicensed frequency band for performing a DL communication operation. In addition, the network 200 also may configure the communication device 202 a UL CC in the licensed frequency band for performing a UL communication operation. The first DL CC and the UL CC may be the same CC in the TDD mode. The UL CC and the first DL CC are different CCs in the FDD mode. The second DL CC may be a TDD CC or a FDD CC.

Figure 3:
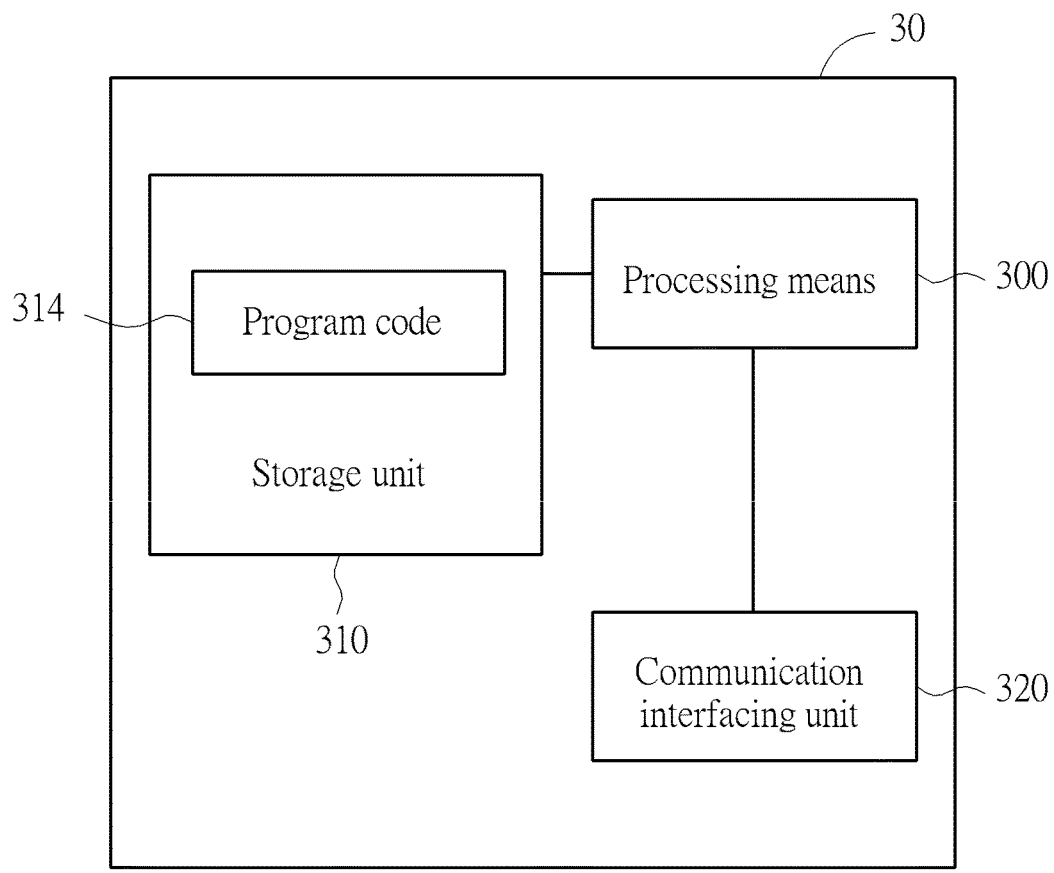
FIG. 3 is a schematic diagram of a communication device according to an example of the present invention.

Please refer to FIG. 3, which is a schematic diagram of a communication device 30 according to an example of the present invention. The communication device 30 may be used in the network 100, the WLAN 102 or the communication device 104 shown in FIG. 1, but is not limited herein. The communication device 30 may include a processing means 300 which includes one or more than one microprocessor or Application Specific Integrated Circuit (ASIC), a storage unit 310 and a communication interfacing unit 320. The storage unit 310 may be any data storage device that may store a program code 314, accessed and executed by the processing means 300. Examples of the storage unit 310 include but are not limited to a subscriber identity module (SIM), read-only memory (ROM), flash memory, random-access memory (RAM), non-volatile storage unit, non-transitory computer-readable medium (e.g., tangible media), etc. The communication interfacing unit 320 is preferably a transceiver and is used to transmit and receive signals (e.g., data, signals, messages and/or packets) according to processing results of the processing means 300.

Figure 4:
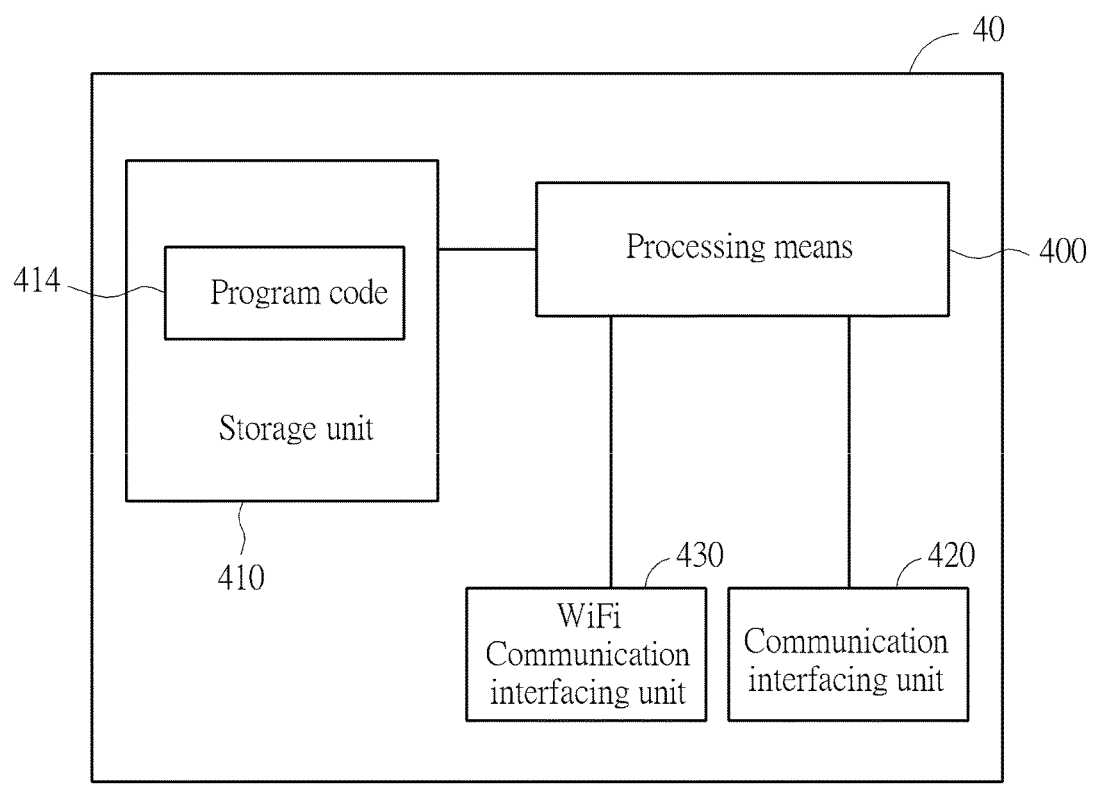
FIG. 4 is a schematic diagram of a communication device according to an example of the present invention.

In order to utilize the unlicensed frequency band in the LTE system, the LTE air interface may be upgraded to operate in the unlicensed frequency band, please refer to FIG. 4. FIG. 4 is a schematic diagram of a communication device 40 according to an example of the present invention. The communication device 40 may be used in the network 100, the WLAN 102 or the communication device 104 shown in FIG. 1, but is not limited herein. The communication device 40 may include a processing means 400 which includes one or more than one microprocessor or ASIC, a storage unit 410, a communication interfacing unit 420 and a WiFi communication interfacing unit 430. The storage unit 410 may be any data storage device that may store a program code 414, accessed and executed by the processing means 400. The communication interfacing unit 420 or WiFi communication interfacing unit 430 is preferably a transceiver and is used to transmit and receive signals according to processing results of the processing means 400.

In one example, the processing means 400 may include two microprocessors. The communication interfacing unit 420 is used to transmit and receive LTE signals according to process results of one microprocessor and the WiFi communication interfacing unit 430 is used to transmit and receive the signals according to process results of the other microprocessor.

Figure 5:
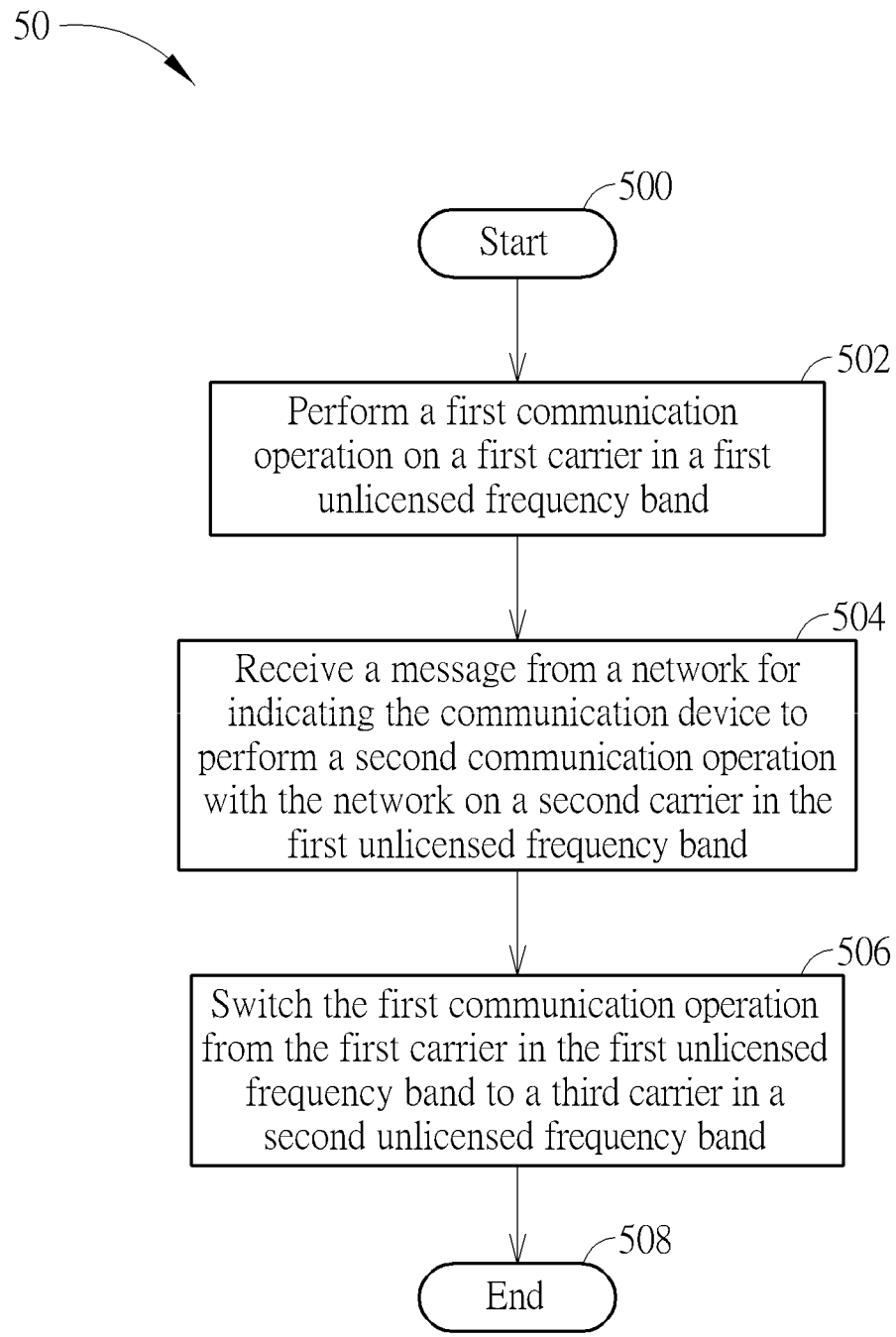
FIG. 5 is a flowchart of a process according to an example of the present example.

FIG. 5 is a flowchart of a process 50 according to an example of the present invention. The process 50 may be utilized in a communication device (e.g., the communication device 104 in FIG. 1), to handle communication operations in a licensed frequency band and an unlicensed frequency band. The process 50 may be compiled into the program code 314 and/or 414, and includes the following steps:

Step 500: Start.

Step 502: Perform a first communication operation on a first carrier in a first unlicensed frequency band.

Step 504: Receive a message from a network for indicating the communication device to perform a second communication operation with the network on a second carrier in the first unlicensed frequency band.

Step 506: Switch the first communication operation from the first carrier in the first unlicensed frequency band to a third carrier in a second unlicensed frequency band.

Step 508: End.

According to the process 50, the communication device may perform a first communication operation on a first carrier in a first unlicensed frequency band. The communication device may receive a message from a network for indicating the communication device to perform a second communication operation with the network on a second carrier in the first unlicensed frequency band. The communication device may switch the first communication operation from the first carrier in the first unlicensed frequency band to a third carrier in a second unlicensed frequency band.

That is, the communication device may first perform the first communication operation on the first carrier in the first unlicensed frequency band. Next, the communication device may perform the first communication operation on the third carrier in the second unlicensed frequency band instead of the first unlicensed frequency band, after the network configures the communication device to perform the second communication operation with the network on the second carrier in the first unlicensed frequency band. The communication device performs the first communication operation on the third carrier in the second unlicensed frequency band simultaneously while the communication device performs the second communication operation on the second carrier in the first unlicensed frequency band. Thus, the first communication operation and the second communication operation are not interfered with each other in the same frequency band.

In one example, the communication device in the process 50 may perform a third communication operation on a fourth carrier in the licensed frequency band. The second carrier in the first unlicensed frequency band and the fourth carrier in the licensed frequency band may be component carriers of a cellular system (e.g., LTE system). Further, the first communication operation may include a WiFi transmission or a WiFi reception. The second communication operation and the third communication operation may include a UL transmission or a DL reception of the cellular system (e.g., LTE system). The first unlicensed frequency band and the second unlicensed frequency band may be at different frequency bands.

According to the above description, an example is illustrated as below. At the beginning, the communication device may perform the third communication operation (e.g., UL transmission or DL reception of the cellular system (e.g., LTE system)) with the network on the fourth carrier (e.g., a component carrier) in the licensed frequency band, and may perform the first communication operation (e.g., WiFi transmission or WiFi reception) with a WiFi Access Point (AP) on the first carrier in the first unlicensed frequency band (e.g., 5 GHz). Then, the network may configure the communication device to perform the second communication operation (e.g., UL transmission or DL reception of the cellular system (e.g., LTE system)) on the second carrier (e.g., a component carrier) in the first unlicensed frequency band, by transmitting the message (e.g., RRC message, such as RRCConnectionReconfiguration message) to the communication device.

That is, the communication device may be configured to aggregate the second carrier and the fourth carrier in a same eNB (e.g., carrier aggregation) or different eNBs (e.g., dual connectivity). In this situation, in order not to interfere with the second communication operation (e.g., UL transmission or DL reception of the cellular system (e.g., LTE system)) in the first unlicensed frequency band, the communication device may switch the first communication operation (e.g., WiFi transmission or WiFi reception) from the first carrier in the first unlicensed frequency band (e.g., 5 GHz) to the third carrier in the second unlicensed frequency band (e.g., 2.4 GHz).

As a result, according to the above description, interference between the communication operations in the licensed frequency band and the unlicensed frequency band are solved, by switching the communication operation (e.g., the WiFi transmission or the WiFi reception) from the original unlicensed frequency band to another unlicensed frequency band.

Figure 6:
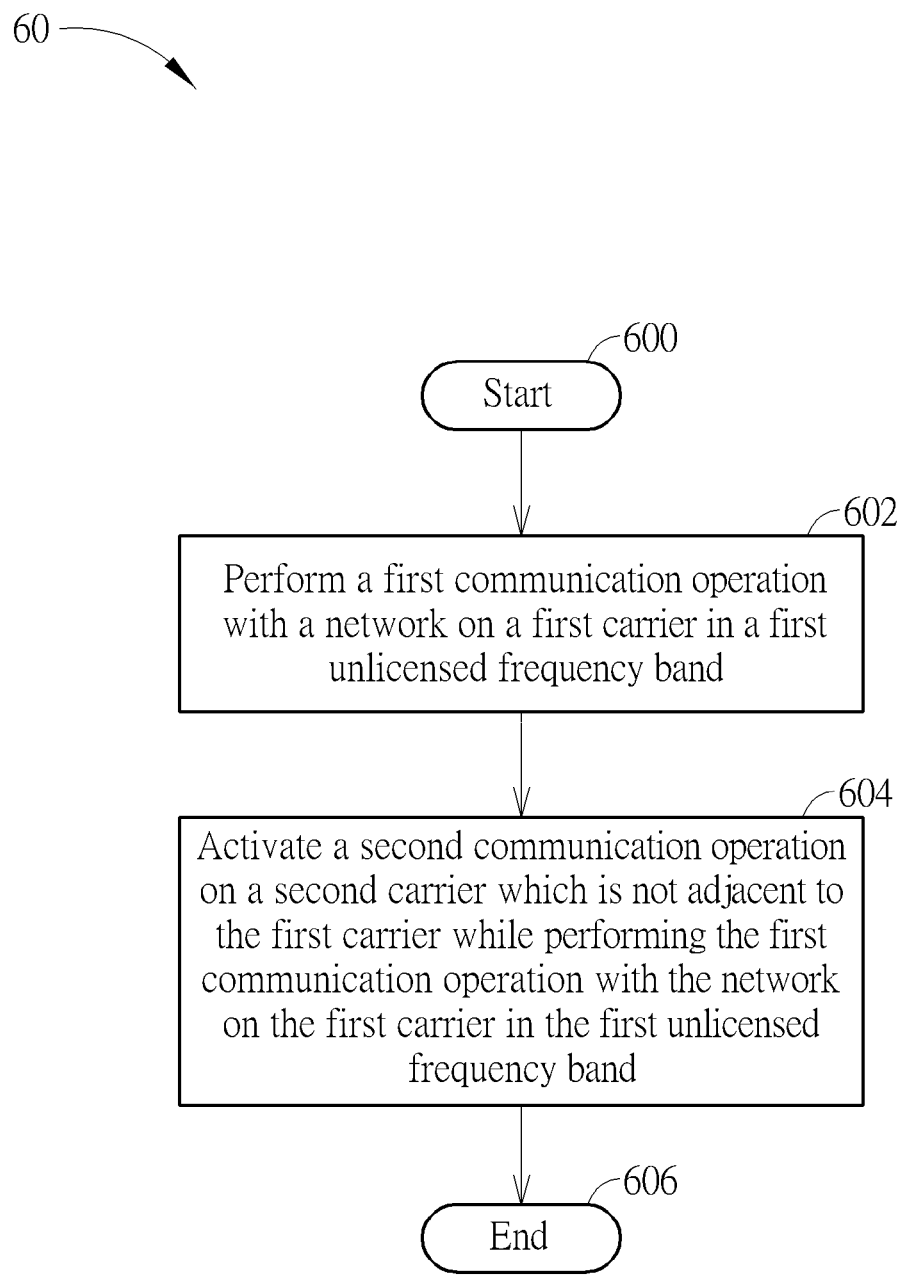
FIG. 6 is a flowchart of a process according to an example of the present example.

FIG. 6 is a flowchart of a process 60 according to an example of the present invention. The process 60 may be utilized in a communication device (e.g., the communication device 104 in FIG. 1), to handle communication operations in a licensed frequency band and an unlicensed frequency band. The process 60 may be compiled into the program code 314 and/or 414, and includes the following steps:

Step 600: Start.

Step 602: Perform a first communication operation with a network on a first carrier in a first unlicensed frequency band.

Step 604: Activate a second communication operation on a second carrier which is not adjacent to the first carrier while performing the first communication operation with the network on the first carrier in the first unlicensed frequency band.

Step 606: End.

According to the process 60, the communication device may perform a first communication operation with a network on a first carrier in a first unlicensed frequency band. Then, the communication device may activate a second communication operation on a second carrier which is not adjacent to the first carrier while performing the first communication operation with the network on the first carrier in the first unlicensed frequency band. In order to respond to the activation, the communication device shall select the second carrier which is not adjacent to the first carrier to activate the second communication operation, if the network configures the first carrier in the first unlicensed frequency band to the communication device to perform the first communication operation with the network. That is, the communication device does not activate the second communication on the first carrier while performing the first communication operation with the network on the first carrier. Thus, the first communication operation and the second communication operation are not interfered with each other.

In one example, the communication device may perform a third communication operation with the network on a third carrier in a licensed frequency band. In one example, the first carrier and the third carrier may be component carriers of the cellular system (e.g., LTE system). In one example, the first communication operation and the third communication operation may include a UL transmission or a DL reception of the cellular system (e.g., LTE system). The second communication operation may include a WiFi transmission or a WiFi reception. Further, in one example, the second carrier is in a second unlicensed frequency band and the first unlicensed frequency band and the second unlicensed frequency band may be in different unlicensed frequency bands. The communication device does not activate the second communication in the first unlicensed frequency band while performing the first communication operation with the network on the first carrier in the first unlicensed frequency band. In another example, the first carrier and the second carrier are in the first unlicensed frequency band and are not overlapped with a gap between them in the band.

According to the above description, an example is illustrated as follows. At the beginning, the communication device may perform the third communication operation (e.g., UL transmission or DL reception of the cellular system (e.g., LTE system)) with the network on the third carrier (e.g., a component carrier) in the licensed frequency band. Then, the network may configure the communication device to perform the first communication operation (e.g., UL transmission or DL reception of the cellular system (e.g., LTE system)) on the first carrier (e.g., a component carrier)

in the first unlicensed frequency band (e.g., 5 GHZ) by transmitting a message (e.g., RRC message, such as RRC-ConnectionReconfiguration message) to the communication device on the third carrier or on a fourth carrier in the licensed frequency band.

That is, the communication device may be configured to aggregate the first carrier and the third carrier in a same eNB (e.g., carrier aggregation) or different eNBs (e.g., dual connectivity). In this situation, in order not to interfere with the first communication operation (e.g., UL transmission or DL reception of the cellular system (e.g., LTE system)) on the first carrier in the first unlicensed frequency band (e.g., 5 GHz), the communication device may select the second carrier in the second unlicensed frequency band (e.g., 2.4 GHz) to activate the second communication operation (e.g., WiFi transmission or WiFi reception) with a WiFi AP. When the communication device is not configured to aggregate any component carrier in the first unlicensed frequency band, the communication device may select the first carrier or another carrier in the first unlicensed frequency band to activate the second communication operation.

Ideally, as long as there is a gap between the first carrier and the second carrier, the first and the second carriers can be in the first unlicensed frequency band. The width of the gap is in general related to (e.g., inverse proportional to) the magnitude of the interference between the first carrier and the second carrier.

Figure 7:
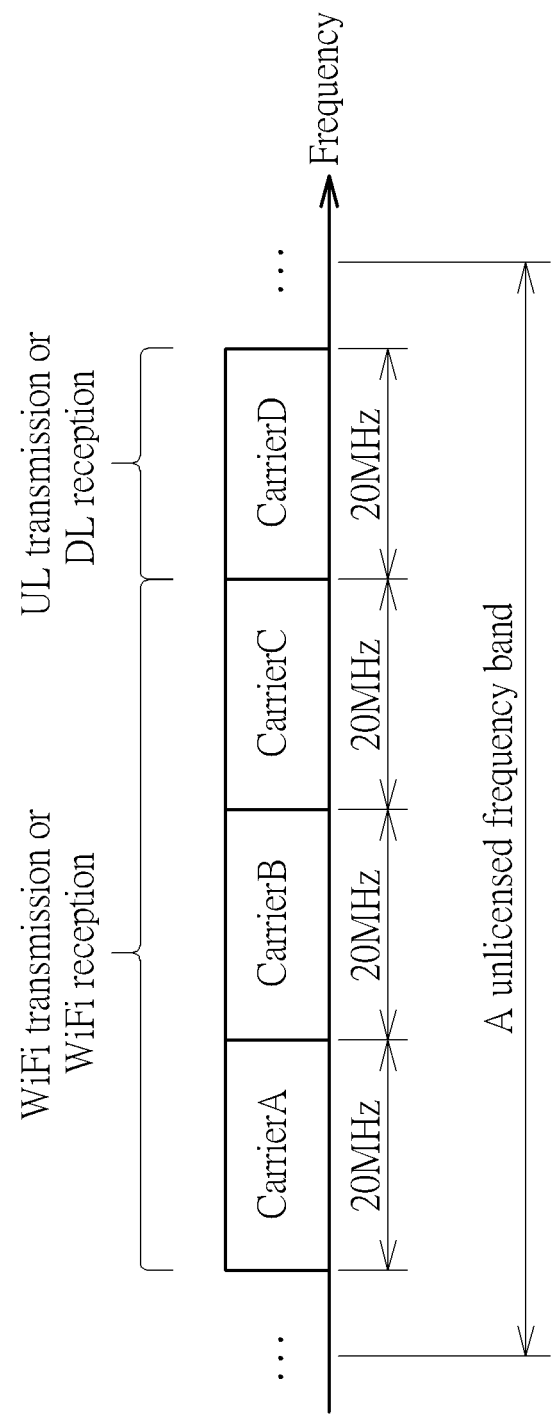
FIG. 7 is a schematic diagram of selection of a carrier for transmitting WiFi signals according to an example of the present invention.

FIG. 7 is a schematic diagram of selection of a carrier for transmitting WiFi signals according to an example of the present invention. In FIG. 7, the bandwidth of a carrier CarrierA, a carrier CarrierB, a carrier CarrierC and a carrier CarrierD are the same (e.g., 20 MHz) in an unlicensed frequency band (e.g., the first unlicensed frequency band in process 60). At the beginning, the network may configure the carrier CarrierD or part of the carrier CarrierD to the communication device to perform a first communication operation (e.g., UL transmission or DL reception of the cellular system (e.g., LTE system)). In this situation, the communication device may only select one of the carrier CarrierA, the carrier CarrierB, and the carrier CarrierC to activate a second communication operation (e.g., WiFi transmission or WiFi reception). In order to reduce interference between the selected carrier (e.g., carrier CarrierA, carrier CarrierB or carrier CarrierC) and the carrier CarrierD, the communication device preferably selects the carrier CarrierA for performing the second communication operation (e.g., WiFi transmission or WiFi reception) according to the definition of the width of the gap.

As a result, according to the above description, interference between the communication operations in the licensed frequency band and the unlicensed frequency band are solved, by activating the WiFi transmission (or the WiFi reception) on one carrier which differs from (e.g., not overlapped) another carrier configured with the UL transmission (or the DL reception).

Figure 8:
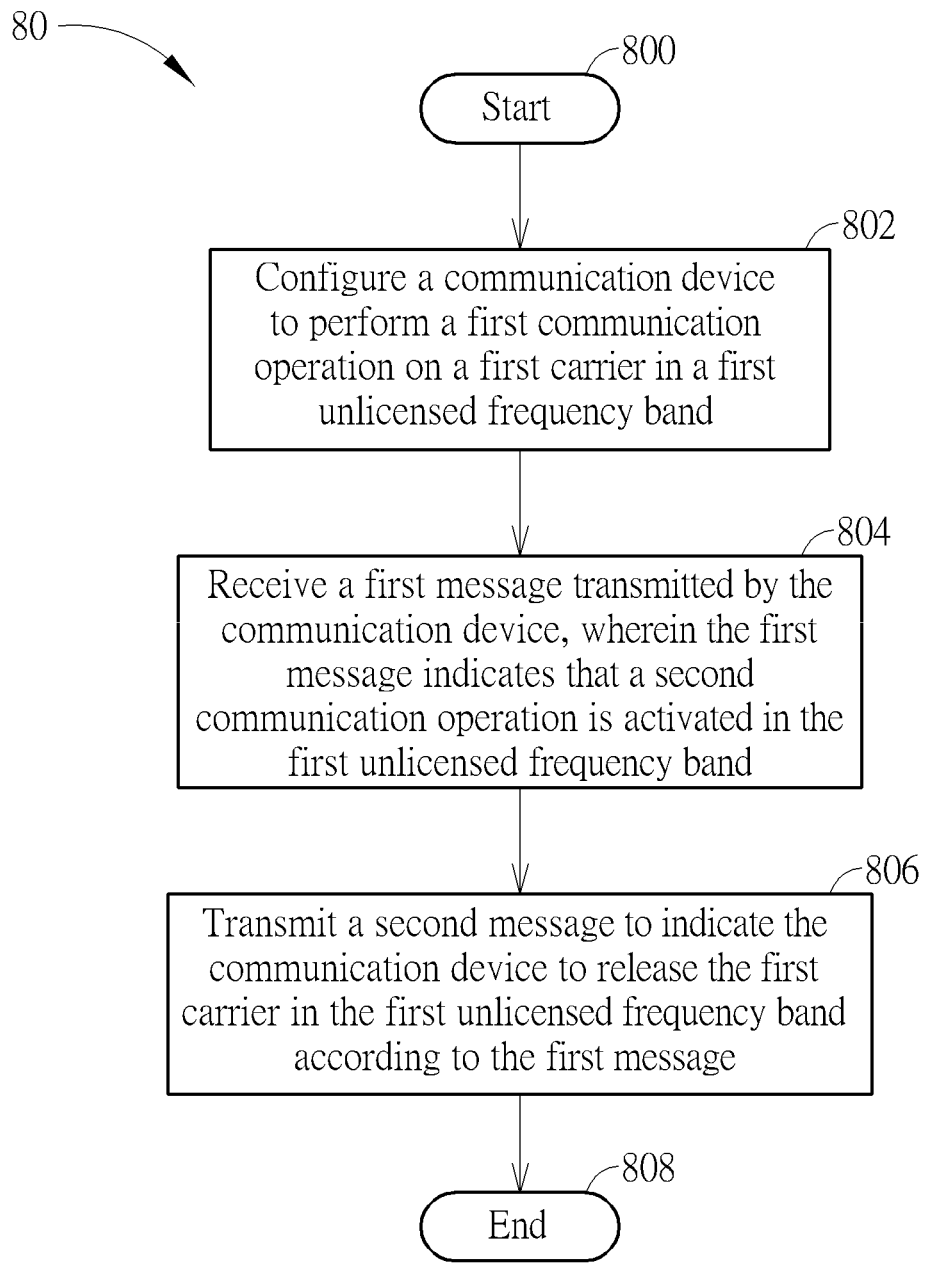
FIG. 8 is a flowchart of a process 90 according to an example of the present invention.

FIG. 8 is a flowchart of a process 80 according to an example of the present invention. The process 80 may be utilized in a network (e.g., the network 100 in FIG. 1), to handle communication operations in a licensed frequency band and an unlicensed frequency band. The process 80 may be compiled into the program code 314 or 414, and includes the following steps:

Step 800: Start.

Step 802: Configure a communication device to perform a first communication operation on a first carrier in a first unlicensed frequency band.

Step 804: Receive a first message transmitted by the communication device, wherein the first message indicates that a second communication operation is activated in the first unlicensed frequency band.

Step 806: Transmit a second message to indicate the communication device to release the first carrier in the first unlicensed frequency band according to the first message.

Step 808: End.

According to the process 80, the network may configure a communication device to perform a first communication operation on a first carrier in a first unlicensed frequency band. Then, the network may receive a first message transmitted by the communication device, wherein the first message indicates that a second communication operation is activated in the first unlicensed frequency band. Next, the network may reconfigure the communication device to stop the first communication operation on the first carrier according to the first message. Thus, the network may transmit a second message to indicate the communication device to release the first carrier in the first unlicensed frequency band according to (e.g., in response to) the first message. The network may stop the first communication operation on the first carrier in the first unlicensed frequency band when receiving the first message. That is, the network may change its decision regarding an allocation of the first carrier according to a notification from the communication device, to avoid interference between the communication operations.

In other words, the communication device may transmit the first message to the network for indicating that the second communication operation has been activated in the first unlicensed frequency band, if the second communication operation is activated during the first communication operation in the first unlicensed frequency band. Next, the network may decide to release the first communication operation to avoid the interference between the communication operations in the first unlicensed frequency band after receiving the first message. The communication device may release the first carrier after receiving the second message transmitted by the network according to the decision. Thus, the second communication operation is not interfered by the first communication operation in the same frequency band.

In one example, the network may configure the communication device to perform a third communication operation with the network on a second carrier in a licensed frequency band. In one example, the first communication operation may include a UL transmission or a DL reception of the cellular system (e.g., LTE system). The second communication operation may include a WiFi transmission or a WiFi reception. In one example, the first carrier and the second carrier may be component carriers of the cellular system (e.g., LTE system). In one example, the first message may include a WiFi channel number or information of the first unlicensed frequency band, and the second message transmitted by the network may indicate the communication device to perform the first communication operation with the network on a third carrier in a second unlicensed frequency band.

According to the above description, an example is illustrated as follows. At the beginning, the network may configure the communication device to perform the first communication operation (e.g., UL transmission or DL reception of the cellular system (e.g., LTE system)) on the first carrier (e.g., a component carrier) in the first unlicensed frequency band and the third communication operation (e.g., UL transmission or DL reception of the cellular system (e.g., LTE system)) on the second carrier (e.g., a component carrier) in the licensed frequency band. Next, the network may receive the first message (e.g., RRC message such as UEAssistanceInformation message, InDeviceCoexIndication message, or newly defined RRC message or Medium Access Control control element) transmitted by the communication device, for indicating that the second communication operation (e.g., WiFi transmission or WiFi reception) has been activated in the first unlicensed frequency band. After receiving the first message, the network may determine to reconfigure the communication device to stop the first communication operation on the first carrier and then may transmit the second message (e.g., RRC message such as RRCConnectionReconfiguration message) to the communication device for indicating to release the first carrier. In addition, the second message may or may not further configure (e.g., indicate) the communication device to perform the first communication operation with the network on a third carrier (e.g., a component carrier) in a second unlicensed frequency band. The first message may include carrier information suggesting the third carrier for the first communication operation.

In another example, the network may transmit a third message (e.g., RRC message such as RRCConnectionReconfiguration message) to the communication device for configuring (e.g., indicating) the communication device to perform the first communication operation with the network on a fourth carrier in a third unlicensed frequency band. The second unlicensed frequency band and the third unlicensed frequency band may be the same unlicensed frequency band. Further, the third carrier and the fourth carrier may be the same carrier, if the second unlicensed frequency band and the third unlicensed frequency band are the same unlicensed frequency band.

In one example, the network may further receive a fourth message (e.g., RRC message such as UEAssistanceInformation message, InDeviceCoexIndication message, or newly defined RRC message or Medium Access Control (MAC) control element) transmitted by the communication device for indicating the second communication operation to be deactivated in the first unlicensed frequency band. Then, the network may transmit a fifth message (e.g., RRC message such as RRCConnectionReconfiguration message) to the communication device, for indicating the communication device to perform the first communication operation on the first carrier or a fifth carrier (e.g., a component carrier) in the first unlicensed frequency band, after receiving the fourth message. In addition, the first carrier and the fifth carrier may be component carriers.

As a result, according to the above description, interference between the communication operations in the licensed frequency band and the unlicensed frequency band are solved, by stopping to configure the UL transmission (or the DL reception) of the cellular system (e.g., LTE system) in the first unlicensed frequency band, or by reconfiguring the UL transmission (or the DL reception) of the cellular system (e.g., LTE system) in the second unlicensed frequency band which differs from the first unlicensed frequency band configured with the WiFi transmission (or the WiFi reception).

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 30 or 40. The LTE system may be changed to another cellular system such as a UMTS or a 5G system.

To sum up, the present invention provides a method for handing communication operations in a licensed frequency band and an unlicensed frequency band. According to the present invention, a communication device and a network are able to perform the communication operations to avoid the interference effect between carriers in the licensed frequency band. Thus, the problem that the interference exists between the communication operations is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling communication operations in a licensed frequency band and a plurality of unlicensed frequency bands, comprising:
   a data storage device for storing instructions of:
   performing a WiFi communication operation on a first carrier in a first unlicensed frequency band;
   receiving a message from a network for indicating the communication device to perform a first cellular communication operation with the network on a second carrier in the first unlicensed frequency band;
   performing the first cellular communication operation with the network according to the message; and
   switching the WiFi communication operation from the first carrier in the first unlicensed frequency band to a third carrier in a second unlicensed frequency band in response to the message, after performing the first cellular communication operation on the second carrier in the first unlicensed frequency band; and
   a processing circuit, coupled to the data storage device, configured to execute the instructions stored in the data storage device.

2. The communication device of claim 1, wherein the instructions further comprise:
   performing a second cellular communication operation on a fourth carrier in the licensed frequency band.

3. The communication device of claim 1, wherein the WiFi communication operation comprises a WiFi transmission or a WiFi reception and the first cellular communication operation comprises an uplink (UL) transmission or a downlink (DL) reception of a cellular system.

4. A communication device for handling communication operations in a licensed frequency band and a plurality of unlicensed frequency bands, comprising:
   a data storage device for storing instructions of:
   performing a first cellular communication operation with a network on a first carrier in a first unlicensed frequency band;
   activating a WiFi communication operation;
   selecting a second carrier in the first unlicensed frequency band for the WiFi communication operation and the second carrier is not overlapped with the first carrier, in response to that the communication device is configured by the network to perform the first cellular communication operation with the network on the first carrier in the first unlicensed frequency band;
   wherein the first cellular communication operation comprises an uplink (UL) transmission or a downlink (DL)

reception of a cellular system and the WiFi communication operation comprises a WiFi transmission or a WiFi reception; and a processing circuit, coupled to the data storage device, configured to execute the instructions stored in the data storage device.

5. The communication device of claim 4, wherein the instructions further comprise:

performing a second cellular communication operation with the network on a third carrier in a licensed frequency band.

6. A cellular network for handling communication operations in a licensed frequency band and a plurality of unlicensed frequency bands, comprising:

a data storage device for storing instructions of:

configuring a communication device to perform a first cellular communication operation on a first carrier in a first unlicensed frequency band;

receiving a first message transmitted by the communication device, wherein the first message indicates that a WiFi communication operation is activated in the first unlicensed frequency band; and transmitting a second message to indicate the communication device to release the first cellular communication operation on the first carrier in the first unlicensed frequency band according to the first message;

wherein the first cellular communication operation comprises an uplink (UL) transmission or a downlink (DL) reception of a cellular system and the WiFi communication operation comprises a WiFi transmission or a WiFi reception; and a processing circuit, coupled to the data storage device, configured to execute the instructions stored in the data storage device.

7. The cellular network of claim 6, wherein the instructions further comprise:

configuring the communication device to perform a second cellular communication operation with the network on a second carrier in a licensed frequency band.

8. The cellular network of claim 6, wherein the first message comprises a WiFi channel number or information of the first unlicensed frequency band.

9. The cellular network of claim 6, wherein the second message further indicates the communication device to perform the first cellular communication operation with the network on a third carrier in a second unlicensed frequency band.

10. The cellular network of claim 6, wherein the instructions further comprise:

transmitting a third message to the communication device, wherein the third message further indicates the communication device to perform the first cellular communication operation on a fourth carrier in a third unlicensed frequency band.

11. The cellular network of claim 6, wherein the instructions further comprise:

receiving a fourth message transmitted by the communication device, wherein the fourth message indicates that the WiFi communication operation is deactivated in the first unlicensed frequency band; and transmitting a fifth message to the communication device, wherein the fifth message indicates the communication device to perform the first cellular communication operation on the first carrier or a fifth carrier in the first unlicensed frequency band.

12. The cellular network of claim 6, wherein the instruction further comprise:

stopping the first cellular communication operation on the first carrier in the first unlicensed frequency band when receiving the first message.

* * * * *